United States Patent [19]

Schaefer

[11] Patent Number: 5,021,633

[45] Date of Patent: Jun. 4, 1991

[54] ENGINE BLOCK HEATER

[75] Inventor: Ron Schaefer, Winnipeg, Canada

[73] Assignee: Budd Canada Inc., Winnipeg, Canada

[21] Appl. No.: 397,112

[22] Filed: Aug. 22, 1989

[30] Foreign Application Priority Data

Dec. 14, 1988 [CA] Canada .................................. 585890

[51] Int. Cl.[5] .............................................. B60L 1/02

[52] U.S. Cl. .................................... 219/208; 392/453

[58] Field of Search ............... 219/208, 335, 336, 536, 219/318; 123/142.5 E, 142.5 R

[56] References Cited

U.S. PATENT DOCUMENTS

| | | | |
|---|---|---|---|
| 2,274,445 | 5/1940 | Greer | 219/336 |
| 2,544,458 | 12/1948 | Higgins | 219/318 |

FOREIGN PATENT DOCUMENTS

| | | |
|---|---|---|
| 250632 | 6/1925 | Canada . |
| 250640 | 12/1926 | Canada . |
| 717626 | 9/1965 | Canada . |
| 717627 | 9/1965 | Canada . |

OTHER PUBLICATIONS

1988 Zero Start Catalog.

*Primary Examiner*—Bruce A. Reynolds

*Assistant Examiner*—Tu Hoang

*Attorney, Agent, or Firm*—Harness, Dickey & Pierce

[57] ABSTRACT

It is difficult if not impossible to install conventional engine block heaters robotically. The present device includes a cylindrical body with a heater element extending upon one side thereof and operatively connected to terminals on the other side thereof with a sealing o-ring around the body portion for sealing engagement with a cylindrical aperture formed in the engine block wall. A retainer ring surrounds the outer end of the body portion having at least one of standing portion formed thereon with an aperture formed therethrough and a corresponding screw-threaded aperture is formed in the wall of the block to one side of the aperture into which the heater engages. Installation by robotic means includes a probe engaging the aperture in the off-standing portion of the ring and into the screw threaded aperture of the block to locate the heater radially and in alignment with the aperture in the block whereupon the heater is pushed into sealing engagement with the aperture, the probe is removed and a retaining bolt is inserted into the aperture in the retaining ring and screw threadably engaged in the screw threaded aperture in the block thereby retaining the heater in position with all of the above steps being accomplished robotically.

11 Claims, 1 Drawing Sheet

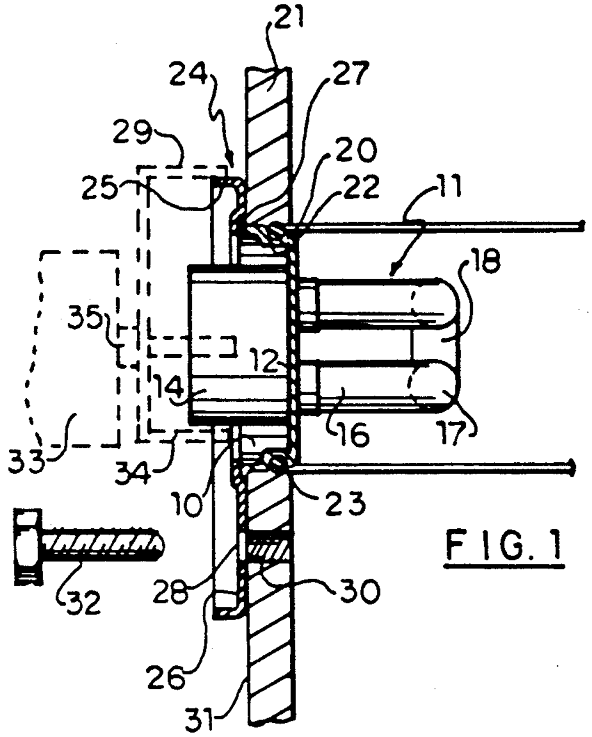
FIG. 1
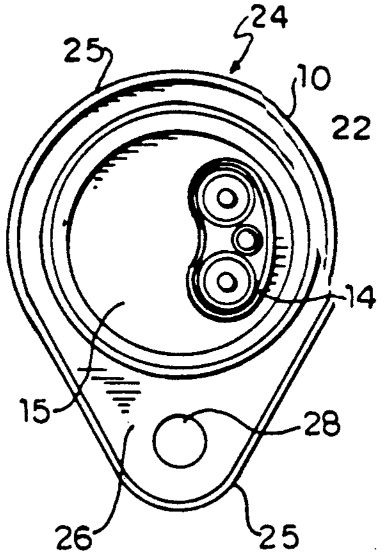
FIG. 2
FIG. 3
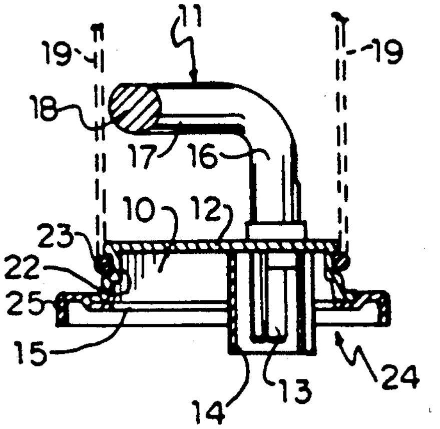
FIG. 4
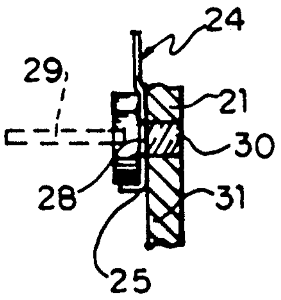

ENGINE BLOCK HEATER

BACKGROUND OF THE INVENTION

This invention relates to new and useful improvements in the construction of block heaters for the engine blocks of any liquid cooled engine, said construction permitting the installation to be accomplished either manually or, preferably, robotically.

Conventional block heaters are normally installed manually by engaging the body portion thereof into an aperture formed in the wall of the cylinder block and then manipulating screw threaded means to extend arms or projections either to engage the inner surface of the wall around the aperture and thereby pull the heater into engagement or by engaging projections into the wall of the aperture. These actions are difficult if not impossible to accomplish economically by robotic means.

The present invention overcomes these disadvantages by providing a heater having an o-ring seal around the body portion and which is pushed into engagement through the aperture in the wall whereupon a bolt engages through the outer flange of the heater and into the wall and is provided only to prevent outward movement of the heater once installed. This enables the heater to be installed manually as in retrofitting or, preferably, robotically during the initial engine assembly.

In accordance with the invention there is provided an engine block heater for automobile engines and the like, adapted to be engaged within a cylindrical aperture in the engine block and comprising in combination a substantially cylindrical body portion, and an electrical heating element extending from one side thereof, electrical connector means on the other side thereof operatively connected to said heating element and a surrounding flange plate extending radially from adjacent said other side of said body portion having an outer diameter greater than the cylindrical body portion and the cylindrical opening in the associated engine block. Sealing means around said body portion and an aperture through said flange plate outboard of said cylindrical body portion for the location and the eventual fastening of said heater to the associated engine block after insertion of said body portion within said cylindrical aperture in said engine block.

Another aspect of the invention is to provide a method of robotically installing an engine heater into an apertured cylinder block wall of a fluid cooled engine consisting of the steps of:

(a) aligned the body portion of said heater with the aperture within said cylinder block;
(b) engaging a probe within the aperture within said flange rim;
(c) aligning said probe and said aperture within said ring with the screw threaded aperture within said cylinder block;
(d) withdrawing said probe;
(e) engaging a screw threaded bolt through said aperture within said ring and screw threadably engaging same within said screw threaded aperture in said block to secure said heater within the aperture in said block.

Another advantage of the invention is to simplify the construction of conventional engine heaters by eliminating all of the moving parts normally required for detachably securing an engine heater in position.

A still further advantage of the invention is to provide a device of the character herewithin described which is simple in construction and installation, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevation of the heater shown installed within an aperture in the wall of the associated engine block and partially sectioned for clarity.

FIG. 2 is an outer side elevation of the heater per se.

FIG. 3 is a view of the heater of FIG. 1 but rotated through 90°.

FIG. 4 is a frequency partially schematic view showing the probe for aligning the heater attaching aperture with the securing aperture in the block.

In the drawings like characters of reference indicate corresponding parts in the different figures.

DETAILED DESCRIPTION

Proceeding therefore to describe the invention in detail, reference character 10 shows a cylindrical body portion or block having a heater element collectively designated 11 extending from the inner end 12 thereof operatively connected through the block to terminals 13 contained within shroud 14 on the other or outer side 15 of the block or body portion.

The element is conventional in construction and includes the two leg portions 16 which extend perpendicularly from the inner end 12 of the body portion and then are angulated at approximately 90° to form portions 17 which are joined by crossbar portion 18 all of which is conventional. However, it should be appreciated that the angulated portions 17 and crossbar portion 18 are confined within the projected diameter of the body portion identified in FIG. 3 by the dotted lines 19 thus permitting the heater to be installed within an aperture 20 formed in the cylinder block wall 21 by moving the block heater perpendicular to the plane of the engine block wall. This avoids any manipulation requirements in order to engage the element through the aperture 20 in contrast to most of the existing block heaters which have to be hooked through the aperture in order to engage the body portion within the wall, and action that is difficult if not impossible to accomplish robotically.

The body portion includes a surrounding annular groove 22 into which is seated an o-ring 23 which engages the wall of the aperture 20 when inserted thus providing an adequate seal which will withstand the normal pressure of the fluid (not illustrated) circulating within the engine block under normal running conditions.

A retaining ring is provided collectively designated 24 which is substantially circular when viewed in plan and which has an outer flanged lip 25 formed around the periphery thereof for stiffening purposes and an offstanding ear portion 26 is formed on one side of the retainer ring as clearly shown in FIG. 2 and is also flanged as at 25. This retainer ring may be welded to the front side of the body portion 11 as indicated by reference character 27, either continuously or spot-welded as desired. This of course is accomplished during the manufacture of the heater element assembly.

The aforementioned ear portion 26 is apertured as a 28, said aperture having two functions. Firstly, it permits a probe 29 to be engaged through the aperture robotically once the element has been aligned with the aperture 20 within the cylinder block. Jaws 29 shown schematically and in phantom in FIG. 1, may form part of the robotic machinery which is conventional in operation thus permitting the body to be rotated axially relative to the aperture 20 until the probe engages a screw threaded attaching aperture 30 formed through the wall of the block to one side of the apertured 20. Once the correct radial location has been ascertained, the jaws may then move endwise and insert the heater body into the aperture 20 with the o-ring 23 sliding along the wall of the aperture 20 until the flange engages the outer face 31 of the cylinder block wall. At this point, the probe is withdrawn and a screw-threaded bolt 32 is inserted robotically and screw-threadably engaged within the screw-threaded aperture 30 thus holding the heater firmly in position against the face 31 of the engine block wall with the o-ring 23 providing the necessary seal.

The bolt 32, correctly tightened, resists any outward movement of the heater element due to vibration or fluid pressure particularly during the operation of the engine.

Reference character 33 shows in phantom and schematically, one portion of the robotic installer which includes jaws 34 to hole the heater and to rotate same with the probe 29 in position, rotating around the axis pivot 35 also shown schematically.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. An engine block heater for vehicle engines and the like, adapted to be engaged within a cylindrical aperture in the engine block which includes a threaded opening adjacent the aperture, said heater comprising:

- a substantially cylindrical body portion adapted to be inserted into a cylindrical aperture in an engine block;
- an electrical heating element extending from one side whereby it extends in the engine block;
- electrical connector means on the other side thereof operatively connected to said heating element;
- a flange plate extending radially from said body portion;
- sealing means adapted for sealing said body portion with the cylindrical aperture, said sealing means positioned around said body portion for sealing engagement with a portion of the engine block defining the cylindrical aperture;
- and at least one aperture through said flange plate outboard of said cylindrical body portion for receiving a fastener engageable with a threaded opening in the engine block, whereby the fastener cooperates with the flange plate surrounding the aperture to enable mounting of the heater to the engine block.

2. The block heater according to claim 1 in which said flange plate includes at least one offstanding ear portion, and wherein said at least one aperture through said flange plate being situated within said ear portion.

3. An engine block heater for vehicle engines and the like, adapted to be engaged within a cylindrical aperture in the engine block which includes a threaded opening adjacent the aperture, said heater comprising in combination, a cylindrical body portion adapted to be inserted into an aperture in an engine block, an electrical heating element extending from one side thereof whereby it extends into the engine block, electrical connection means on the other side thereof operatively connected to said heater element, sealing means adapted for sealing said body portion with the aperture, said sealing means positioned about said body portion for sealing engagement with a portion of the engine block defining the aperture, and a surrounding flange plate extending radially from said body portion, said flange plate having an outer dimension greater than the body portion and the cylindrical aperture in said engine block, said flange plate being provided with an aperture through said flange plate outboard of said cylindrical body portion for receiving a fastener engageably with a threaded opening in the engine block, whereby the fastener cooperates with the flange plate surrounding the apeture to enable mounting of the heater to the engine block, and means for enabling robotic manipulation of said flange for mounting said securing said block heater to the associated engine block.

4. The block heater according to claim 3 in which said flange plate includes at least one offstanding ear portion including an aperture for enabling said robotic manipulation of said flange for mounting and securing of said block heater to the associated engine block.

5. The block heater according to claim 1 in which said flange plate includes an outer periphery with an outer rim formed thereon.

6. The block heater according to claim 2 in which said flange plate includes an outer periphery with an outer rim formed thereon.

7. The block heater according to claim 3 in which said flange plate includes an outer periphery with an outer rim forward thereon.

8. The block heater according to claim 4 in which said flange plate includes an outer periphery with an outer rim formed thereon.

9. The block heater according to claims 1, 2 or 3 in which said heating element extends substantially perpendicular to said inner end of said body portion and then angulates at approximately 90 degrees to lie substantially parallel to said inner end, said angulated portion terminating at a location within the projected diameter of said body portion whereby insertion of said heater within the aperture of said cylinder wall is substantially perpendicular to the plane of said wall.

10. The block heater according to claims 4, 5, or 6 in which said heating element extends substantially perpendicular to said inner end of said body portion and then angulates at approximately 90 degrees to lie substantially parallel to said inner end, said angulated portion terminating at a location within the projected diameter of said body portion whereby insertion of said heater within the aperture of said cylinder wall is substantially perpendicular to the plane of said wall.

11. The block heater according to claims 7 or 8 in which said heating element extends substantially perpendicular to said inner end of said body portion and then angulates at approximately 90 degrees to lie substantially parallel to said inner end, said angulated portion terminating at a location within the projected diameter of said body portion whereby insertion of said heater within the aperture of said cylinder wall is substantially perpendicular to the plane of said wall.

* * * * *